US011257078B2

(12) United States Patent
Mittal et al.

(10) Patent No.: US 11,257,078 B2
(45) Date of Patent: Feb. 22, 2022

(54) METHOD AND SYSTEM FOR UTILIZING BLOCKCHAIN AND TELECOM NETWORK FOR TWO FACTOR AUTHENTICATION AND ENHANCING SECURITY

(71) Applicant: MASTERCARD INTERNATIONAL INCORPORATED, Purchase, NY (US)

(72) Inventors: Shreya Mittal, Delhi (IN); Deepak Yadav, Gurgaon (IN); Amit Gupta, New Delhi (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 295 days.

(21) Appl. No.: 16/105,015

(22) Filed: Aug. 20, 2018

(65) Prior Publication Data
US 2020/0058021 A1 Feb. 20, 2020

(51) Int. Cl.
*G06Q 20/40* (2012.01)
*G06Q 30/02* (2012.01)
(Continued)

(52) U.S. Cl.
CPC ....... *G06Q 20/385* (2013.01); *G06Q 20/3674* (2013.01); *G06Q 20/389* (2013.01); *G06Q 20/3829* (2013.01); *G06Q 20/401* (2013.01)

(58) Field of Classification Search
CPC ........................................ G06Q 20/00–20/425
See application file for complete search history.

(56) References Cited

U.S. PATENT DOCUMENTS 8,806,600 B2\* 8/2014 Taratine ................. G06F 21/34
 726/7
10,079,682 B2\* 9/2018 Lu ......................... H04L 9/3247
(Continued)

OTHER PUBLICATIONS

Antonopoulos, Mastering Bitcoin, 2014, published by O'Reilly Media, Inc., pp. 45, 61, 159, 163, 170-171, 175, (Year: 2014).*
(Continued)

*Primary Examiner* — John W Hayes
*Assistant Examiner* — Chenyuh Kuo
(74) *Attorney, Agent, or Firm* — Buchanan Ingersoll & Rooney PC

(57) ABSTRACT

A method for conveying a one-time password using blockchain includes: receiving proposed transaction data from a merchant system including payment credentials, receiving account details, and a transaction amount; identifying user account data associated with the payment credentials including an account identifier; identifying a one-time password; transmitting the one-time password and account identifier to a third party system; receiving a data identification value from an external computing device; identifying a blockchain data value included in a blockchain including a password value based on the received data identification value; validating, the identified one-time password based on the password value; and initiating payment of the transaction amount from a first transaction account associated with the payment credentials to a second transaction account associated with the receiving account details upon validation of the identified one-time password.

20 Claims, 5 Drawing Sheets

(51) Int. Cl.
*G06Q 20/32* (2012.01)
*G06Q 20/34* (2012.01)
*G06Q 20/38* (2012.01)
*G06Q 20/36* (2012.01)

(56) References Cited

U.S. PATENT DOCUMENTS

| | | | |
|---|---|---|---|
| 10,298,396 B1* | 5/2019 | Kurani | G06F 21/33 |
| 2008/0077526 A1* | 3/2008 | Arumugam | G06Q 30/06 |
| | | | 705/44 |
| 2008/0103984 A1* | 5/2008 | Choe | G06Q 20/3821 |
| | | | 705/76 |
| 2016/0048828 A1* | 2/2016 | Lee | G06Q 20/3265 |
| | | | 705/39 |
| 2016/0063463 A1* | 3/2016 | Min | G06Q 20/4014 |
| | | | 705/44 |
| 2017/0048234 A1* | 2/2017 | Lohe | H04L 9/3297 |
| 2019/0394648 A1* | 12/2019 | Tipton | H04W 12/08 |

OTHER PUBLICATIONS

Satoshi Nakamoto, Bitcoin: A Peer-to-Peer Electronic Cash System, bitcoin.org, May 24, 2009) (Year: 2009).*

* cited by examiner

METHOD AND SYSTEM FOR UTILIZING BLOCKCHAIN AND TELECOM NETWORK FOR TWO FACTOR AUTHENTICATION AND ENHANCING SECURITY

FIELD

The present disclosure relates to the use of two factor authentication for payment transactions, specifically the use of a blockchain and participation by a telecom network as a third party to provide for additional authentication for a payment transaction even in instances where telecom service is unavailable to the consumer.

BACKGROUND

Two factor authentication is used in many places and by many financial institutions to provide an added layer of security when a consumer wants to conduct a financial transaction. In such cases, when a transaction is submitted to a financial institution for approval, a one-time password is transmitted to the consumer registered with the transaction account being used in the transaction, such as via the consumer's mobile device, through e-mail, an application program, etc. The consumer submits the one-time password to the financial institution through a suitable interface, which thereby serves as the consumer's approval that they authorized the transaction. When this approval is received, the financial institution approves the transaction and the processing continues. This serves to prevent fraud as if a fraudster attempts a transaction (e.g., with a stolen card), the consumer will receive the one-time password but, knowing they did not initiate a transaction, will not enter the one-time password to prevent authorization of the transaction and can notify the financial institution of the attempted fraud.

However, one-time passwords are only as effective as the ability for the consumer to receive the password and supply it to the financial institution. In cases where the consumer does not have cellular service or is otherwise unable to receive the one-time password or submit it back to the financial institution, the consumer may be entirely unable to conduct payment transactions using their transaction account. For example, a consumer that is traveling abroad may not have a mobile device that has local cellular service and is thus unable to receive the one-time password or submit it back to the financial institution. Similarly, if the consumer is at a location where their mobile device does not have service due to poor network conditions, the transaction may not be able to proceed. The same problem may exist in cases where the consumer's mobile device does not have power, or if the consumer is not currently in possession of their mobile device (e.g., it was left at home, someone is borrowing it, etc.). In any of these cases, the consumer may wish to conduct a payment transaction but may be unable to.

Thus, there is a need for a new system whereby two factor authentication can be used to provide for increased security of payment transactions while at the same time not requiring an active network connection for a mobile device.

SUMMARY

The present disclosure provides a description of systems and methods for conveying a one-time password using a blockchain. A consumer initiates a payment transaction with a merchant, presenting their transaction account details to the merchant. The merchant submits the transaction for authorization using traditional methods and systems. The transaction is routed to a processing server where a one-time password is identified. The one-time password is provided to a telecom network, but rather than the one-time password being routed directly to the consumer (e.g., to a mobile device associated therewith), the telecom network submits the one-time password to a blockchain using a private key associated with the consumer. A value identifying a new entry to the blockchain that includes the one-time password is provided to the transaction account's issuing financial institution. The financial institution can then verify the one-time password on the blockchain and approve the transaction accordingly. The result is the successful two factor authentication of a transaction without the consumer having to receive the one-time password directly, enabling the two factor authentication to be used successfully even if the consumer does not have their mobile device or does not have adequate service. The use of the telecom system for submitting the one-time password to the blockchain can also provide for use of the improved system with minimal impact on existing system architectures.

A method for conveying a one-time password using blockchain includes: receiving, by a receiver of a processing server, proposed transaction data from a merchant system including at least payment credentials, receiving account details, and a transaction amount; executing, by the processing server, a query on a memory of the processing server to identify at least user account data associated with the payment credentials including at least an account identifier; identifying, by the processing server, a one-time password; electronically transmitting, by a transmitter of the processing server, at least the one-time password and account identifier to a third party system; receiving, by the receiver of the processing server, a data identification value from an external computing device; identifying, by the processing server, a blockchain data value included in a blockchain including a password value based on the received data identification value; validating, by the processing server, the identified one-time password based on the password value; and initiating, by the processing server, payment of the transaction amount from a first transaction account associated with the payment credentials to a second transaction account associated with the receiving account details upon validation of the identified one-time password.

A system for conveying a one-time password using blockchain includes: a receiver of a processing server configured to receive proposed transaction data from a merchant system including at least payment credentials, receiving account details, and a transaction amount; the processing server configured to execute a query on a memory of the processing server to identify at least user account data associated with the payment credentials including at least an account identifier, and identify a one-time password; and a transmitter of the processing server configured to electronically transmit at least the one-time password and account identifier to a third party system, wherein the receiver of the processing server is further configured to receive a data identification value from an external computing device, and the processing server is further configured to identify a blockchain data value included in a blockchain including a password value based on the received data identification value, validate the identified one-time password based on the password value, and initiate payment of the transaction amount from a first transaction account associated with the payment credentials to a second transaction account associated with the receiving account details upon validation of the identified one-time password.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
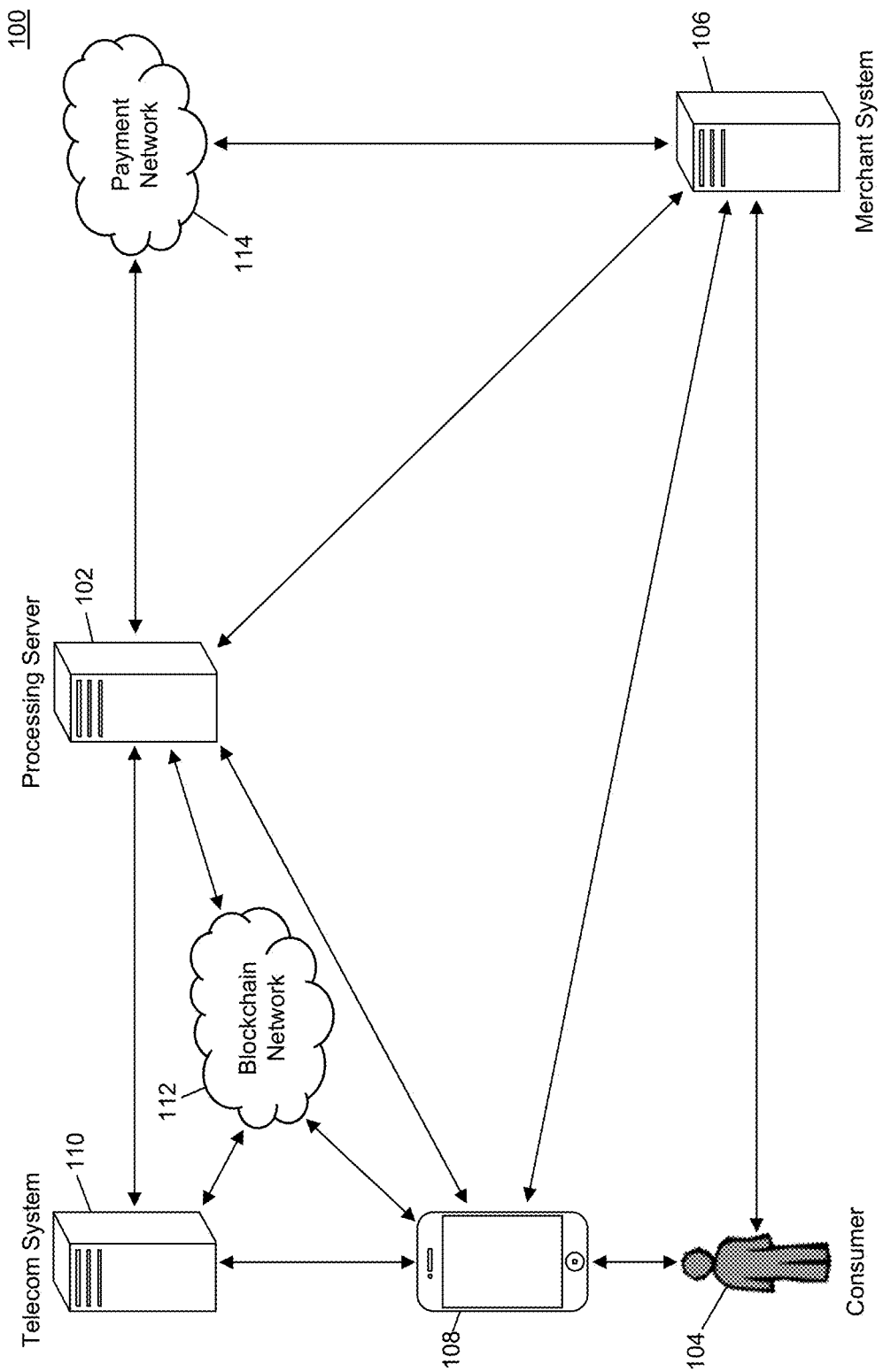
FIG. 1 is a block diagram illustrating a high level system architecture for conveying a one-time password for a payment transaction using a blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPall®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Conveyance of a One-Time Password Using Blockchain

FIG. 1 illustrates a system 100 for the processing of payment transactions with two factor authentication via the use of a one-time password that is conveyed using a blockchain.

The system 100 may include a processing server 102. The processing server 102, discussed in more detail below, may be configured to convey a one-time password as part of an attempted payment transaction and perform verification thereof to assist in the authorization of the payment transaction, where the one-time password is conveyed using a blockchain. In the system 100, a consumer 104 may want to initiate a payment transaction for the purchase of goods or services with a merchant, represented in the system 100 as the merchant system 106. As part of the initiation of the payment transaction, the consumer 104 may provide the merchant system 106 with payment credentials for a transaction account to be used to fund the payment transaction. The payment credentials may be comprised of at least an account number and may be conveyed to the merchant system 106 using any suitable method, such as via a magnetic stripe or integrated circuit payment card, electronic transmission from a mobile computing device 108 (also referred to herein as a mobile communication device 108), encoding in a machine-readable code read by the merchant system 106, etc.

The merchant system 106 may receive the payment credentials and, in a traditional payment transaction, may submit the payment transaction to a payment network 114 (e.g., directly or via one or more intermediate entities such as an acquiring financial institution, gateway processor, etc.) for processing. The submitted payment transaction may include at least the payment credentials and additional transaction data, such as a transaction time, transaction date, geographic location, currency type, transaction amount, merchant data, acquirer data, issuer data, loyalty data, reward data, offer data, product data, etc. The submitted payment transaction may also include account details for a transaction account associated with the merchant system 106 for use in receiving funds for the payment transaction. The payment network 114 may receive the transaction data via payment rails associated therewith.

In some embodiments, the transaction data may be included in a transaction message that is electronically transmitted to the payment network 114 via the associated payment rails. A transaction message may be a specially formatted data message that is formatted pursuant to one or more standards governing the exchange of financial transaction messages, such as the International Organization of Standardization's ISO 8583 or ISO 20022 standards. The transaction message may include a plurality of data elements, where each data element is configured to store values of the transaction data. The payment network 114 may receive the transaction message or other formatted conveyance of the transaction data from the merchant system 106 either directly or through one or more intermediate entities.

In payment transactions where two factor authentication is used, transaction data for the proposed payment transaction may be submitted to the processing server 102. In one embodiment, the merchant system 106 may submit the transaction data to the payment network 114 as discussed above, where the payment network 114 may forward the transaction data to the processing server 102 (e.g., based on an account number or other information indicating that two factor authentication is to be used). In another embodiment, the merchant system 106 may submit proposed transaction data directly to the processing server 102 using a suitable communication network and method. In such embodiments, the proposed transaction data may include at least the payment credentials submitted by the consumer 104, the account details for the transaction account associated with the merchant system 106, and a transaction amount.

The processing server 102 may receive the proposed transaction data and may identify (e.g., based on the account number in the payment credentials or other indication) that two factor authentication is to be performed. As part of the use of two factor authentication, the consumer 104, or the transaction account's issuing financial institution on behalf of the consumer 104, may have registered their transaction account with the processing server 102. Registration of the transaction account may include the storage of at least the account number or other payment credentials for the consumer's transaction account along with an account identifier associated with the consumer 104. The account identifier may be a unique identification value that is unique to the consumer 104 and/or the transaction account. The unique identification value may be an arbitrary value, or may be a value already assigned to the transaction account or other item associated with the consumer 104, such as the mobile communication device 108. For example, the account identifier may be a device identifier associated with the mobile communication device 108, such as a media access control address, internet protocol address, device identification number, registration number, etc. The mobile communication device 108 may be any type of device suitable for performing the functions discussed herein, such as a cellular phone, smart phone, smart watch, wearable computing device, implantable computing device, tablet computing device, etc. In some embodiments, the account identifier may be a private key of a cryptographic key pair, as discussed in more detail below.

Once the account identifier is identified, the processing server 102 may identify a one-time password that is electronically transmitted to a telecom system 110 along with the account identifier. In some embodiments, the processing server 102 may be configured to generate the one-time password. The one-time password may be a value that is randomly or pseudo-randomly generated that is used in two factor authentication, and may be generated using any suitable method. For example, the one-time password may be a random 16 digit integer, a random 12 digit alphanumeric value, a 32 digit hash value generated via hashing a random number, etc. The telecom system 110 may be a computing system of a cellular communication network or other entity associated with the mobile computing device 108 that is configured to electronically transmit communication messages thereto. In some cases, the telecom system 110 may be identified in the account identifier or other account data identified by the processing server 102 using the payment credentials included in the proposed transaction data.

The telecom system 110 may receive the account identifier, which may be used to identify the consumer 104 (e.g., or mobile communication device 108 associated with the consumer 104). The telecom system 110 may then submit the one-time password to a blockchain network 112 for addition to a blockchain associated therewith. The blockchain network 112 may be comprised of a plurality of nodes, where each node may be a computing system configured to maintain a copy of the blockchain, receive data for addition to the blockchain, generate and validate new blocks, and distribute validated blocks to other nodes. The telecom system 110 may submit at least the one-time password to a node in the blockchain network 112.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 112 prior to the generation and addition of a new block to the blockchain in order for the change to be made permanent. Computational and communication limitations may make such a modification exceedingly difficult, if not impossible, thus rendering the blockchain immutable.

Data values included in the blockchain may include one-time passwords submitted by telecom systems 110 for use in two factor authentication of payment transactions. Each data value may include a one-time password and a data identification value, which may be unique to the blockchain data value, which may be assigned by the node in the blockchain network 112 or, in some cases, may be supplied by the telecom system 110 with the one-time password. Once the one-time password is included in a new block that is verified and added to the blockchain, the node in the blockchain network 112 may return the data identification value for that blockchain data value to the telecom system 110.

In some embodiments, a cryptographic key pair may be used to provide for additional security in the submission of one-time passwords to the blockchain network 112. In such embodiments, each consumer 104 may be associated with a cryptographic key pair that is comprised of a private key and a public key. The public key may be provided to the blockchain network 112 as well as the processing server 102. The private key may be possessed by the consumer 104 (e.g., using the mobile communication device 108) or the telecom system 110 on behalf of the consumer 104. The private key may be used to generate a digital signature, which may be submitted to the blockchain network 112 along with the one-time password. In cases where the mobile communication device 108 possess the digital signature, the telecom system 110 may request the digital signature from the mobile communication device 108 prior to submission of the one-time password to the blockchain network 112. In these embodiments, the node in the blockchain network 112 may first verify the digital signature using the public key prior to generating a new blockchain data value. In some cases, the digital signature may be included in the blockchain data value.

Once the blockchain data value including the one-time password has been added to the blockchain and the telecom system 110 has received the data identification value, the processing server 102 may perform verification of the one-time password. In one embodiment, the telecom system 110 may electronically transmit the data identification value to the mobile computing device 108 using any suitable method, such as short messaging service, multimedia messaging service, e-mail, an application program, etc. The mobile computing device 108 may then submit the data identification value to the processing server 102 using a suitable communication method and network. In other embodiments, the telecom system 110 may directly transmit the data identification value to the processing server 102, such as in cases where the mobile computing device 108 may be unavailable or where the consumer 104 has provided authorization to the telecom system 110 to do so.

The processing server 102 may receive the data identification value and may identify a blockchain data value in the blockchain associated with the blockchain network 112 that includes the data identification value. Once the blockchain data value is identified, the processing server 102 may identify the one-time password included therein. The processing server 102 may then verify the one-time password by comparing it to the one-time password previously submitted to the telecom system 110. If the verification is unsuccessful, the proposed payment transaction may be prevented, such as by the processing server 102 returning a decline message to the payment network 114 or the merchant system 106. If the verification is successful, the processing server 102 may initiate processing of the payment transaction. Initiation of processing may include the submission of a transaction message for the payment transaction to the payment network 114 that includes the proposed transaction data, or returning of a message to the payment network 114 indicating that the processing can continue.

In embodiments where a digital signature is used, verification of the one-time password may also include verification of the digital signature by the processing server 102. In such embodiments, the processing server 102 may use the public key included in the account data associated with the consumer's transaction account to verify the digital signature. In some embodiments, the account identifier may be the public key.

In some embodiments, the processing server 102 may be a part of the issuing financial institution that issued the transaction account used by the consumer 104 to fund the proposed payment transaction. In other embodiments, the processing server 102 may operate on behalf of the issuing financial institution. In yet other embodiments, the issuing financial institution may not participate in the steps discussed above, but may participate in the processing of the payment transaction as performed by the payment network 114 using traditional methods and systems. In such an embodiment, the processing server 102 may perform the two factor authentication independently, where the issuing financial institution may not be involved.

In some embodiments, verification of the one-time password may also be based on one or more additional conditions. For instance, in one example, a time limit may be placed on use of the one-time password. In such an example, if the data identification value is not received by the processing server 102 within a predetermined period of time of submission of the one-time password to the telecom system 110, then the verification may be automatically determined to be unsuccessful. In another example, a limit may be placed on the number of unsuccessful verifications that can be performed for a single proposed payment transaction or for a transaction account over a predetermined period of time, to reduce likelihood of fraud.

In yet another example, a smart contract may be used in the blockchain for additional verification. A smart contract is a self-executing item of code that can be included in a blockchain that, when criteria is met, is executed that can perform functions related to the blockchain (e.g., creation of new data values) or outside of the blockchain. In this example, a smart contract may be included in or accompanying the blockchain data value with the one-time password, where the smart contract may be created by the telecom system 110 or the processing server 102 (e.g., and submitted with the one-time password). Verification of the one-time password may then be also based on the smart contract. For instance, the smart contract may execute after a predetermined period of time has passed to generate a new blockchain data value indicating expiration of the one-time password, to prevent its successful verification. In another instance, execution of the smart contract may be initiated by the processing server 102 after receipt of the data identification value, where the smart contract may identify the one-time password (e.g., in place of its direct inclusion in the blockchain data value) or other data used in the verification thereof (e.g., a data identification value of a separate blockchain data value that includes the one-time password, etc.).

The methods and systems discussed herein provide for conveyance of one-time password for a proposed payment transaction that can provide for two factor authentication without the need for a consumer 104 to receive the one-time password directly. The use of a blockchain as part of the conveyance of the one-time password provides for an immutable record of one-time passwords to provide for auditability of transactions while also providing for security in the availability and use of one-time passwords. By having the one-time password submitted through the telecom system 110 rather than by the consumer 104 directly, two factor authentication can be performed by the telecom system 110 as a third party on behalf of the consumer 104 to allow two factor authentication to be performed without active consumer 104 participation, which may be beneficial in cases where the mobile communication device 108 lacks an active connection to a communication network. The result is a system that, through its new architecture and use of a blockchain network 112, provides for all of the benefits of two factor authentication in payment transactions while avoiding a number of the problems with traditional methods.

Processing Server

Figure 2:
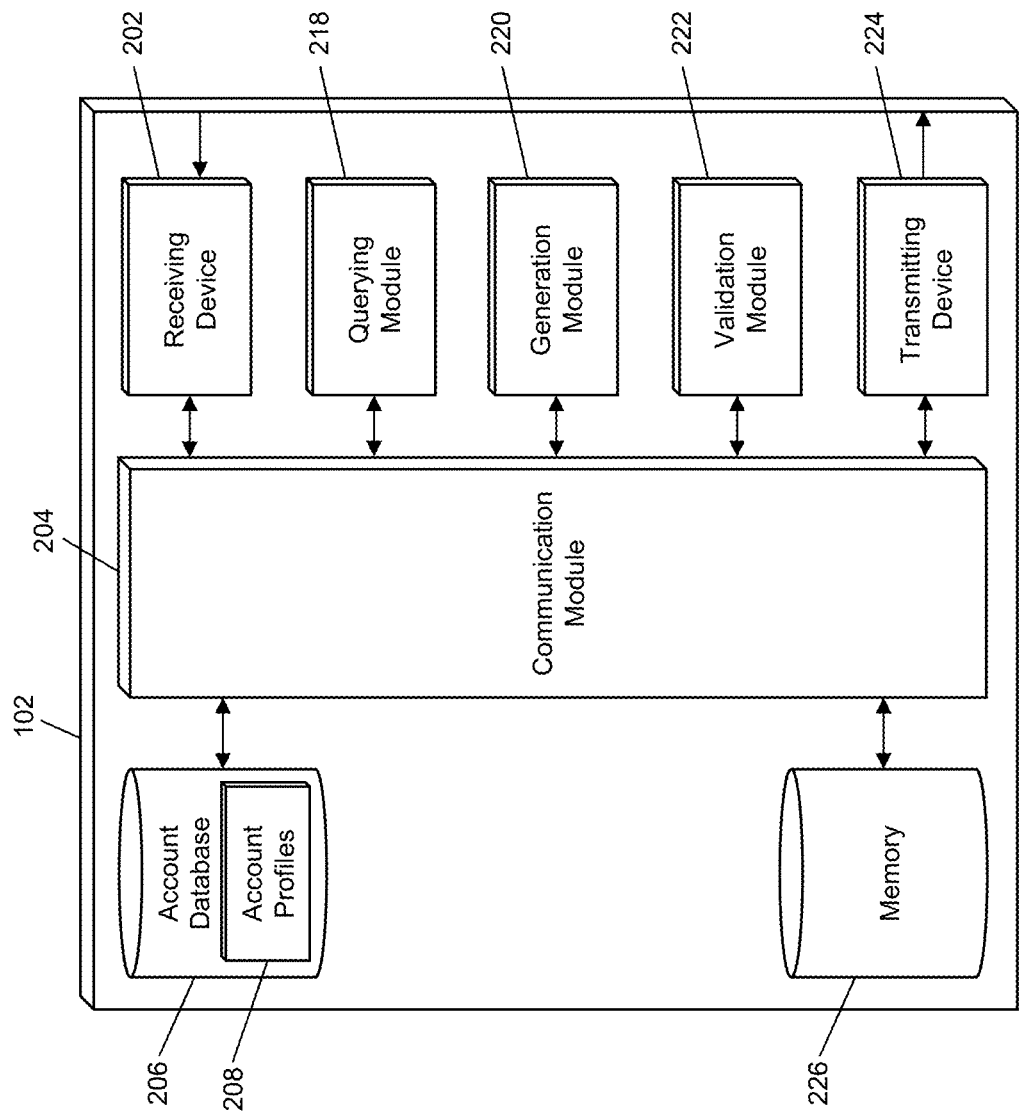
FIG. 2 is a block diagram illustrating the processing server of the system of FIG. 1 for use of two factor authentication in a payment transaction utilizing blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from merchant systems 106, mobile computing devices 108, telecom systems 110, blockchain networks 112, payment networks 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by merchant systems 106 and payment networks 114 that are superimposed or otherwise encoded with proposed transaction data, which may include payment credentials, receiving account details, and a transaction amount. The receiving device 202 may also be configured to receive data signals electronically transmitted by mobile computing devices 108 and telecom systems 110, which may be superimposed or otherwise encoded with data identification values, and, in some cases, digital signatures. The receiving device 202 may also be configured to receive data signals electronically transmitted by nodes in a blockchain network 112 that may be superimposed or otherwise encoded with new blockchain data including blocks or individual blockchain data values.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. An account profile 208 may include, for instance, at least payment credentials or data included therein corresponding to the related transaction account, such as an account number, as well as an account identifier. In some cases, the account profile 208 may further include additional account data, such as a public key, communication data associated with a mobile computing device 108, issuing financial institution data, telecom system 110 identification information, etc.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to identify an account profile 208 that includes payment credentials included in received proposed transaction data, for use in identifying a telecom system 110 for submission of a one-time password.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate one-time passwords using any suitable method. The generation module 220 may also be configured to generate data messages for transmission to other entities in the system 100, such as data messages to telecom systems 110 conveying one-time passwords and messages to blockchain networks 112 for requesting of blockchain data values.

The processing server 102 may also include a validation module 222. The validation module 222 may be configured to perform validations for the processing server 102 as part of the functions discussed herein. The validation module 222 may receive instructions as input, may validate data as instructed, and may output a result of the validation to another module or engine of the processing server 102. In some cases, the data to be validated may be included in the input to the validation module 222. In other cases, the validation module 222 may be configured to identify the data for validation. The validation module 222 may be configured to, for example, validate one-time passwords included in blockchain data values based on a comparison thereto to a previously identified one-time password submitted to a telecom system 110. The validation module 222 may also be configured to verify digital signatures using public keys and suitable signature generation algorithms. In some cases, the validation module 222 may be configured to perform validates based on execution of smart contracts included in blockchain data values.

The processing server 102 may also include a transmitting device 224. The transmitting device 224 may be configured to transmit data over one or more networks via one or more network protocols. In some instances, the transmitting device 224 may be configured to transmit data to merchant systems 106, mobile computing devices 108, telecom systems 110, blockchain networks 112, payment networks 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to merchant systems 106 and payment networks 106 that may be superimposed or otherwise encoded with approval of a proposed payment transaction or transaction data for use in processing a payment transaction, such as a transaction message generated by the processing server 102 for processing thereof. The transmitting device 224 may also be configured to electronically transmit data signals to telecom systems 110 that are superimposed or otherwise encoded with a one-time password and an account identifier. The transmitting device 224 may be further configured to electronically transmit data signals to nodes in a blockchain network 112, which may be superimposed or otherwise encoded with a request for blockchain data values, and may, in some cases, include a data identification value for a specific blockchain data value.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, etc.

Process for Processing of a Payment Transaction with Two Factor Authentication

Figure 3:
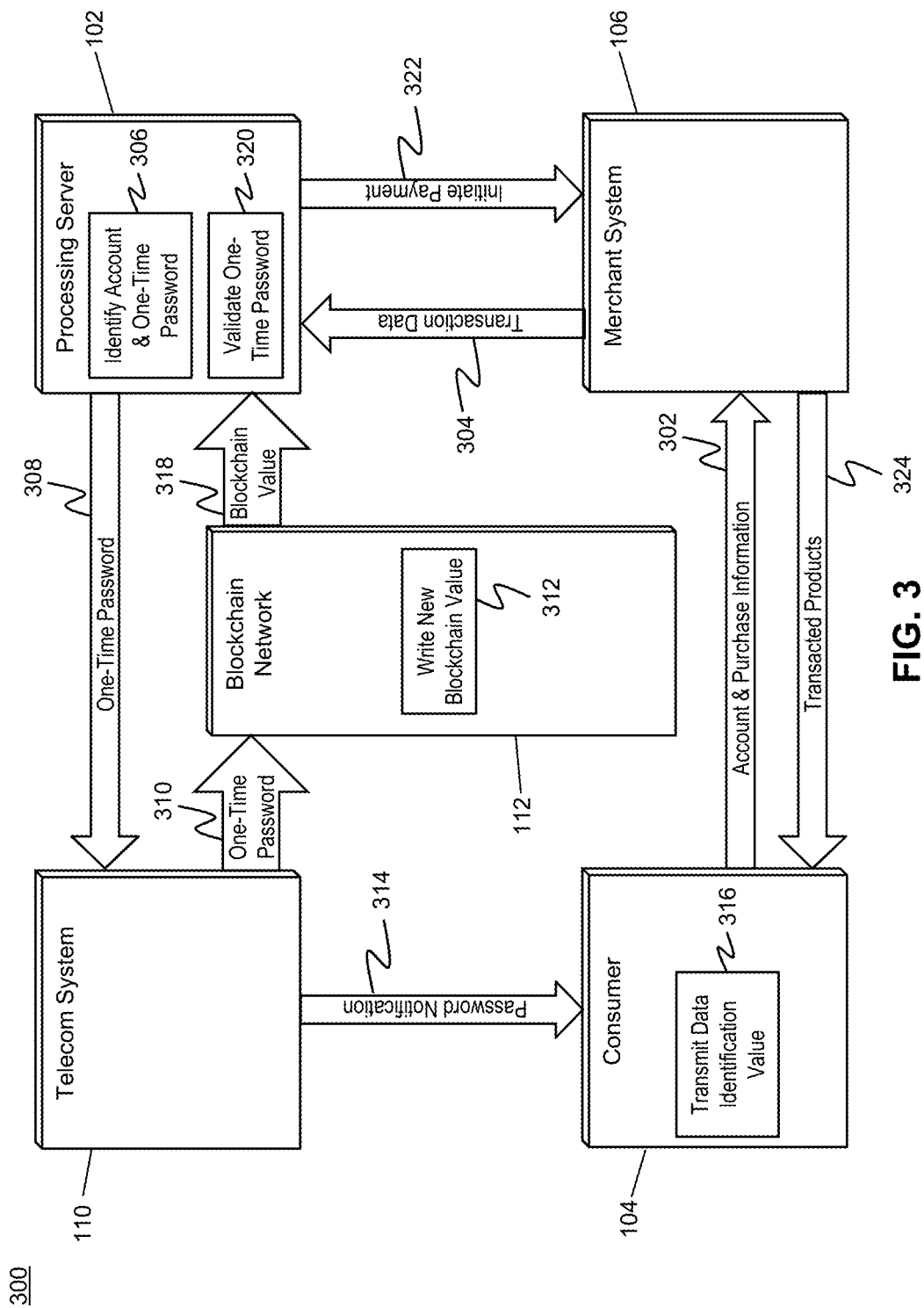
FIG. 3 is a flow diagram illustrating a process for the processing of a payment transaction using two factor authentication and blockchain in the system of FIG. 1 in accordance with exemplary embodiments.

FIG. 3 illustrates an example process 300 for the processing of a payment transaction in the system 100 utilizing two factor authentication via a one-time password conveyed using the blockchain network 112.

In step 302, the consumer 104 may initiate a payment transaction with a merchant system 106 by conveying payment credentials thereto for the purchase of one or more goods or services from the merchant. The payment credentials may include at least an account number and any other information used in the processing of a payment transaction funded using a related transaction account. The merchant system 106 may receive the payment credentials and, in step 304, submit transaction data for a proposed payment transaction to the processing server 102 using a suitable communication network and method. The transaction data may include at least the payment credentials, account information associated with a transaction account of the merchant system 106, and a transaction amount.

In step 306, the querying module 218 of the processing server 102 may execute a query on the account database 206 of the processing server 102 to identify an account profile 208 stored therein that includes the payment credentials included in the proposed transaction data. The processing server 102 may identify the account identifier included in the identified account profile 208 and, as part of step 306, the generation module 220 thereof may generate a one-time password for the proposed payment transaction. In step 308, the transmitting device 224 of the processing server 102 may electronically transmit at least the one-time password and account identifier to the telecom system 110, which may be identified in the account profile 208 such as through the account identifier.

In step 310, the telecom system 110 may submit the one-time password to a node in the blockchain network 112 for inclusion in a new blockchain data value to be included in a new block that is generated and then validated for inclusion in the blockchain. In step 312, the blockchain network 112 may generate a blockchain data value that includes the one-time password and a data identification value, which may be included in a new block that is distributed to multiple nodes in the blockchain network 112 for verification. Once verified, the new block may be added to the blockchain and distributed to all of the nodes in the blockchain network 112.

In step 314, the telecom system 110 may electronically transmit a message to the consumer 104 (e.g., via the mobile computing device 108 associated therewith) that includes a notification that the one-time password has been submitted to the blockchain. In some cases, the blockchain network 112 may provide the data identification value included in the blockchain data value that includes the one-time password to the telecom system 110. In such cases, the notification transmitted to the consumer 104 may include the data identification value. In other instances, the consumer 104 may identify the blockchain data value in the blockchain that includes the one-time password, such as using the public key associated with the consumer 104 or other suitable data.

In step 316, the consumer 104 may, via the mobile computing device 108, electronically transmit the data identification value to the processing server 102 using a suitable communication network and method. In some embodiments, step 316 may be performed by the telecom system. In step 318, the receiving device 202 of the processing server 102 may receive the blockchain data value from the blockchain network 112 that includes the same data identification value received from the consumer 104, which may be specifically requested by the processing server 102 (e.g., in a request transmitted by the transmitting device 224 thereof that includes the consumer-supplied data identification value) or identified (e.g., using the consumer-supplied data identification value) in one or more blocks that are provided to the processing server 102 by the blockchain network 112.

In step 320, the validation module 222 of the processing server 102 may validate the one-time password included in the blockchain data value as being the same one-time password generated by the generation module 220 of the processing server 102 in step 306. Upon successful validation, then, in step 322, the transmitting device 224 of the processing server 102 may initiate payment of the transaction amount from the consumer's transaction account, identified via the payment credentials, to the transaction account associated with the merchant system 106. In some embodiments, step 322 may be performed via the submission of a new transaction message to a payment network 114 or issuing financial institution and processing of a payment transaction based thereon, where the merchant system 106 may receive the payment upon successful processing of the payment transaction. In step 324, the merchant system 106 may provide the consumer 104 with the transacted-for goods or services following receipt of the payment for the payment transaction.

Exemplary Method for Conveying a One-Time Password Using Blockchain

Figure 4:
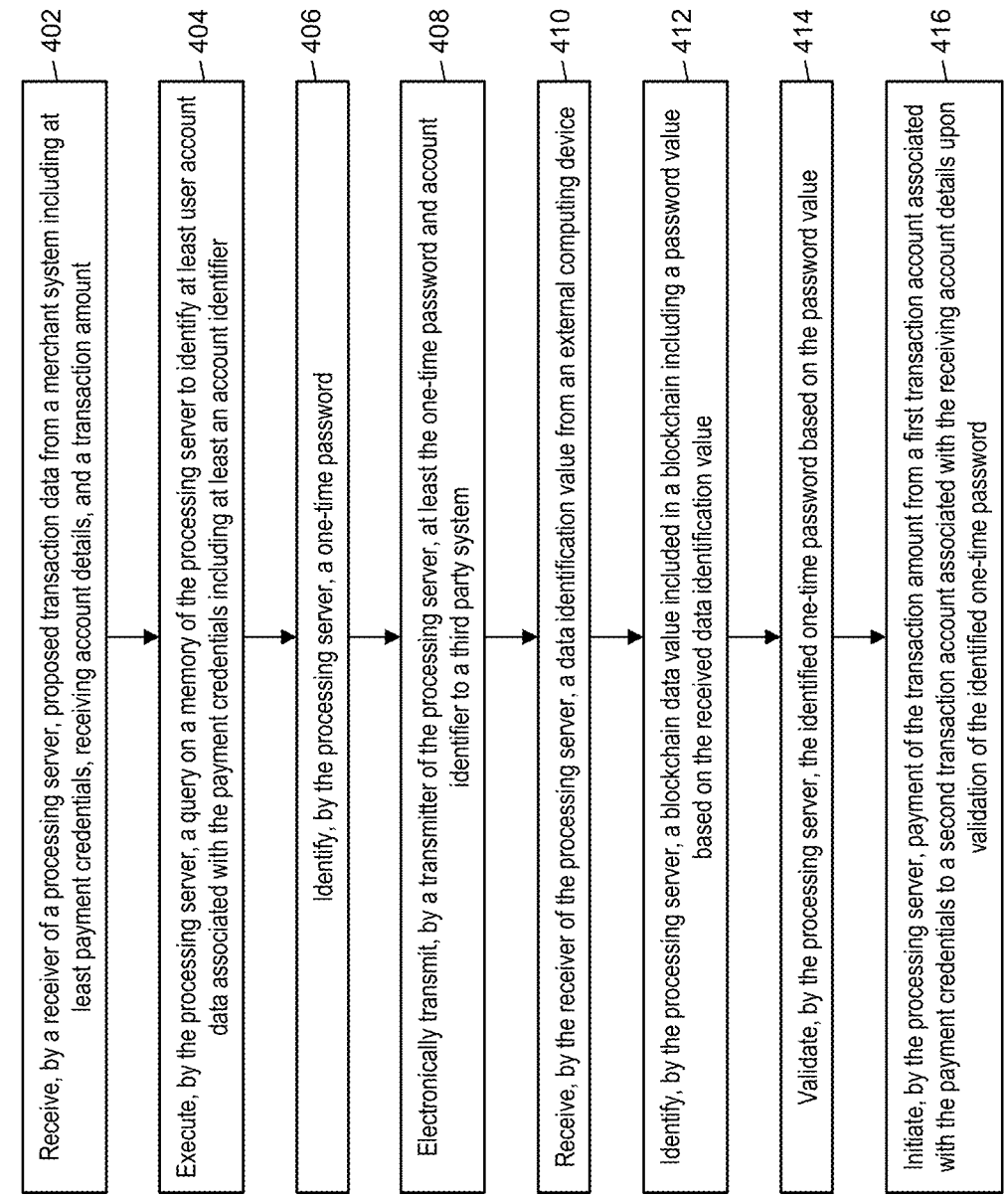
FIG. 4 is a flow chart illustrating an exemplary method for conveying a one-time password using blockchain in accordance with exemplary embodiments.

FIG. 4 illustrates a method 400 for the conveyance of a one-time password using a blockchain for two factor authentication of a proposed payment transaction.

In step 402, proposed transaction data may be received from a merchant system (e.g., the merchant system 106) by a receiver (e.g., the receiving device 202) of a processing server (e.g., the processing server 102), the proposed transaction data including at least payment credentials, receiving account details, and a transaction amount. In step 404, a query may be executed (e.g., via the querying module 218) on a memory (e.g., the account database 206 or memory 226) of the processing server to identify at least user account data associated with the payment credentials including at least an account identifier. In step 406, the processing server may identify a one-time password.

In step 408, at least the one-time password and account identifier may be electronically transmitted to a third party system (e.g., the telecom system 110) by a transmitter (e.g., the transmitting device 224) of the processing server. In step 410, a data identification value may be received by the receiver of the processing server from an external computing device (e.g., the mobile computing device 108). In step 412, a blockchain data value included in a blockchain that includes a password value may be identified by the processing server based on the received data identification value.

In step 414, the identified one-time password may be validated by the processing server (e.g., the validation module 222 thereof) based on the password value. In step 416, payment of the transaction amount from a first transaction account associated with the payment credentials to a second transaction account associated with the receiving account details may be initiated by the processing server upon validation of the identified one-time password.

In one embodiment, the user account data may be included in the proposed transaction data. In some embodiments, identifying the one-time password may include generating, by the processing server (e.g., via the generation module 220 thereof) the one-time password. In one embodiment, validation of the one-time password may be further based on receipt of the data identification value within a predetermined period of time of transmission of the one-time password. In some embodiments, the blockchain data value may further include a smart contract, and validation of the one-time password may be further based on a result of execution of the smart contract.

In one embodiment, the data identification value may be accompanied by a digital signature, and validation of the identified one-time password may be further based on validation of the digital signature using a public key of a cryptographic key pair. In a further embodiment, the public key may accompany the data identification value. In another further embodiment, the public key may be included in the user account data.

Computer System Architecture

Figure 5:
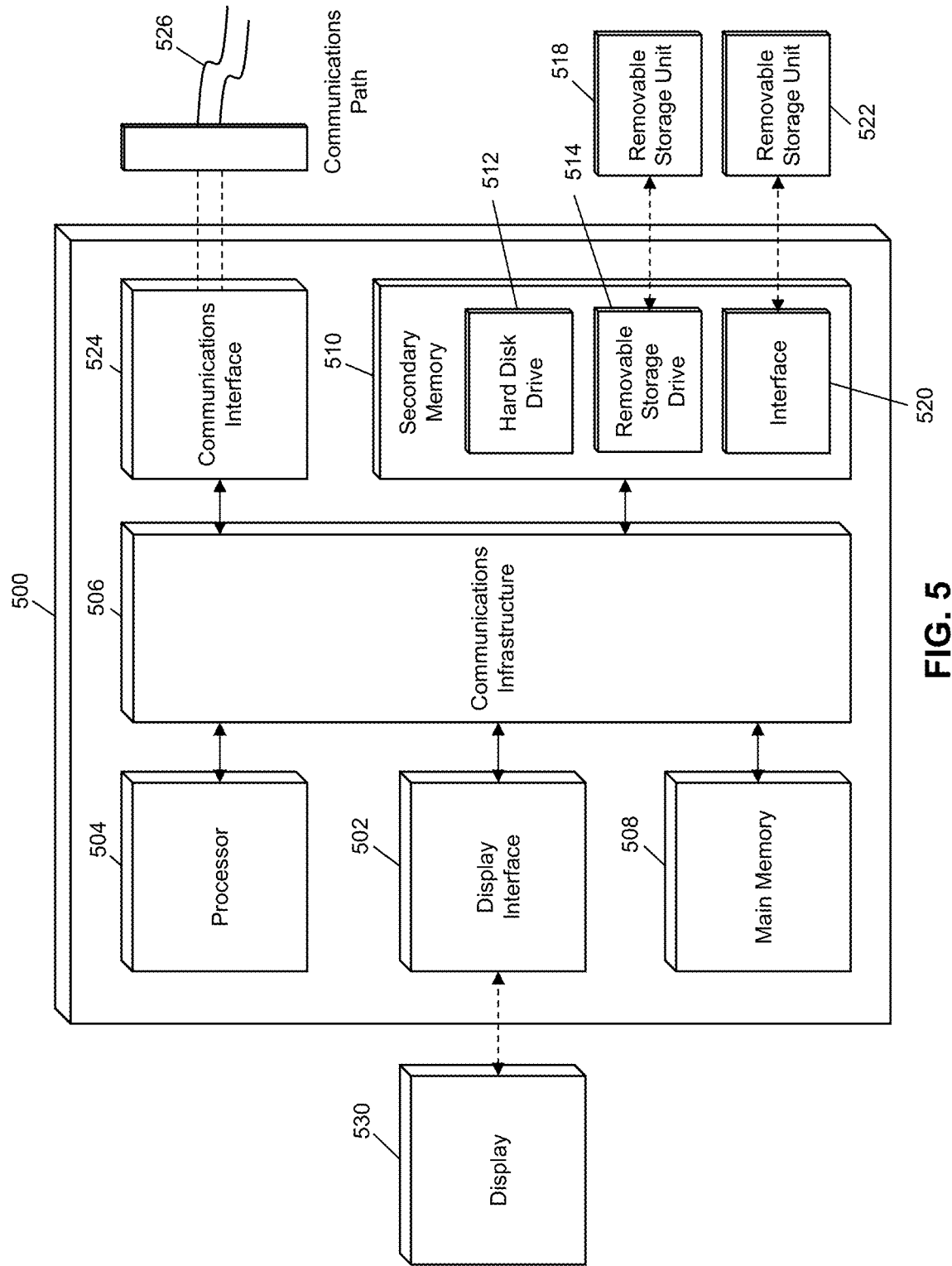
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for conveying a one-time password using blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a payment transaction utilizing two factor authentication with a one-time password, via a blockchain network with a third party system, wherein the one-time password is conveyed via a blockchain data value of a block stored in the blockchain network and the blockchain data value comprises a password value and a data identification value, the method comprising:

storing, by a processing server, a plurality of account profiles in an account database, wherein the processing server comprises the account database, wherein each of the plurality account profiles includes payment credentials and an account identifier;

receiving, by a receiver of a processing server, proposed transaction data of a proposed payment transaction from a merchant system over a communication network, wherein the received transaction data includes first payment credentials, merchant account details, and a transaction amount;

identifying, by the processing server, a first account profile of the plurality of account profiles by querying the account database using the received first payment credentials, wherein the identified first account profile comprises a first account identifier;

based on the identified first account profile, generating, by the processing server, a first one-time password for the proposed payment transaction;

electronically transmitting, by a transmitter of the processing server, the first one-time password and a first account identifier of the identified first account profile to the third party system based on the first account identifier;

receiving, by the receiver of the processing server, a first data identification value from the third party system, wherein the first data identification value is associated with a first blockchain data value of a first block stored in the blockchain network;

sending, by the transmitter of the processing server, a request to the blockchain network for the first blockchain data value, wherein the request comprises the received first data identification value;

receiving, by the receiver of the processing server, the first blockchain data value from the blockchain network;

identifying, by the processing server, a first password value from the received first blockchain data value;

comparing, by the processing server, the first password value to the first one-time password;

determining, by the processing server, that the first password value matches the first one-time password based on the comparison; and in response to the determining that the first password value matches the first one-time password, sending, by the processing server, payment of the transaction amount from a first transaction account associated with the payment credentials to a second transaction account associated with the merchant account details for the proposed payment transaction.

2. The method of claim 1, wherein the proposed transaction data further comprises the first account identifier.

3. The method of claim 1, wherein each of the plurality of the account profile includes a public key, wherein the first data identification value is associated with a digital signature, and wherein comparing the first password value and the first one-time password further comprises:
   validating, by the processing server, the digital signature using a first public key of the identified first account profiles.

4. The method of claim 3, wherein the first account profile comprises the first public key.

5. The method of claim 3, wherein the first account identifier is the first public key.

6. The method of claim 1, wherein the account database stores a period of time, the method further comprising:
   prior to sending the payment of the transaction amount, determining, by the processing device, that the receiving of the first data identification value occurs within the period of time from the transmitting of the first one-time password; and
   wherein the sending of the transaction amount further comprises:
      sending payment of the transaction amount in response to determining that the first password value matches the first one-time password and the determining that the receiving of the first data identification value occurs within the period of time from the transmitting of the first one-time password.

7. The method of claim 1, wherein the first blockchain data value further includes a smart contract, and wherein the determining the password value matches the generated first one-time password includes determining the password value matches the first one-time password by executing the smart contract.

8. A system for processing a payment transaction utilizing two factor authentication with a one-time password, via a blockchain network with a third party systemftelec, wherein the one-time password is conveyed via a blockchain data value of a block stored in the blockchain network and the blockchain data value comprises a password value and a data identification value, the system comprising:
   a processing server, the processing server comprising a processor, an account database and a memory storing instructions that when executed by the processor, cause the processor to perform the steps of:
      storing a plurality of account profiles in the account database, wherein each of the plurality account profiles includes payment credentials and an account identifier;
      receiving proposed transaction data of a proposed payment transaction from a merchant system over a communication network, wherein the received transaction data includes first payment credentials, merchant account details, and a transaction amount;
      identifying a first account profile of the plurality of account profiles by querying the account database using the received first payment credentials, wherein the identified first account profile comprises a first account identifier;
      based on the identified first account profile, generating a first one-time password for the proposed payment transaction;
      electronically transmitting the first one-time password and a first account identifier of the identified first account profile to the third party system based on the first account identifier;
      receiving a first data identification value from the third party system, wherein the first data identification value is associated with a first blockchain data value of a first block stored in the blockchain network;
      sending a request to the blockchain network for the first blockchain data value, wherein the request comprises the received first data identification value;
      receiving the first blockchain data value from the blockchain network;
      identifying a first password value from the received first-blockchain data value;
      comparing the first password value to the first one-time password; and
      determining that the first password value matches the first one-time password based on the comparison; and
      in response to the determining that the first password value matches the first one-time password, sending payment of the transaction amount from a first transaction account associated with the payment credentials to a second transaction account associated with the merchant account details for the proposed payment transaction.

9. The system of claim 8, wherein the proposed transaction data further comprises the account identifier.

10. The system of claim 8, wherein each of the plurality of the account profile includes a public key, wherein the first data identification value is associated with a digital signature, and wherein comparing the first password value and the first one-time password includes:
   validating the digital signature using a first public key of the identified first account profile.

11. The system of claim 10, wherein the first account profile comprises the first public key.

12. The system of claim 10, wherein the account identifier is the public key.

13. The system of claim 8, wherein the account database stores a period of time, and prior to sending the payment of the transaction amount, the memory storing instructions that, when executed by the processor, further cause the processor to perform the step of:
   determining that the receiving of the first data identification value occurs within the period of time from the transmitting of the first one-time password; and
   wherein the sending of the transaction amount further comprises:
      sending payment of the transaction amount in response to determining that the first password value matches the first one-time password and the determining that the receiving of the first data identification value occurs within the period of time from the transmitting of the first one-time password.

14. The system of claim 8, wherein the first blockchain data value further includes a smart contract, and wherein the determining that the first password value matches the first one-time password includes determining that the first password value matches the first one-time password by executing the smart contract.

15. The method of claim 7, wherein the executing the smart contract further comprises:
   determining whether the first one-time password has expired; and
   in response to determining that the first one-time password has expired,
   generating a second blockchain data value, wherein the second blockchain data value comprises an indication that the first one-time password has expired; and
   in response to determining that the first one-time password has expired, sending, by the processing server, a decline message for the proposed payment transaction.

16. The system of claim 8, wherein the executing the smart contract further comprises:
  determining whether the first one-time password has expired; and
  in response to determining that the first one-time password has expired, generating a second blockchain data value, wherein the second blockchain data value comprises an indication that the first one-time password has expired, and
  wherein the memory stores additional instructions that, when executed by the processor, further cause the processor to perform the step of:
    in response to determining that the first one-time password has expired, sending a decline message for the proposed payment transaction to the merchant system.

17. The method of claim 1, further comprising:
  determining, by the processing server, that the first password value does not match the first one-time password;
  generating, by the processing server, a decline message for the proposed payment transaction; and
  transmitting, by the processing server, the decline message to the merchant system.

18. The system of claim 8, the memory storing instructions that, when executed by the processor, further cause the processor to perform the steps of:
  determining, that the first password value does not match the first one-time password;
  generating a decline message for the proposed payment transaction; and
  transmitting the decline message to the merchant system.

19. The method of claim 1, wherein the proposed transaction data includes a transacted-for good or a transacted-for service associated with the transaction amount, the method further comprising:
  receiving, by the merchant system, the payment of the transaction amount in the second transaction account associated with the merchant account details; and
  transmitting, by the merchant system, the transacted-for good or transacted-for service to a consumer.

20. The system of claim 8, wherein the proposed transaction data includes a transacted-for good or a transacted-for service associated with the transaction amount.

* * * * *